(12) United States Patent
Hirsch

(10) Patent No.: US 7,882,211 B2
(45) Date of Patent: Feb. 1, 2011

(54) RELEASE OF INTEGRATION REFERENCE POINTS

(75) Inventor: Lucian Hirsch, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 642 days.

(21) Appl. No.: 11/885,972

(22) PCT Filed: Dec. 15, 2005

(86) PCT No.: PCT/EP2005/056800

§ 371 (c)(1),
(2), (4) Date: Sep. 10, 2007

(87) PCT Pub. No.: WO2006/094566

PCT Pub. Date: Sep. 14, 2006

(65) Prior Publication Data

US 2008/0147838 A1 Jun. 19, 2008

(30) Foreign Application Priority Data

Mar. 8, 2005 (DE) .................. 10 2005 010 609

(51) Int. Cl.
*G06F 15/173* (2006.01)
(52) U.S. Cl. .................. 709/223; 709/217; 709/226; 709/201
(58) Field of Classification Search .................. 709/217, 709/223, 224, 226
See application file for complete search history.

(56) References Cited

U.S. PATENT DOCUMENTS 5,850,511 A * 12/1998 Stoecker et al. .............. 714/38
6,044,468 A    3/2000 Osmond
6,138,154 A *  10/2000 Karino .................. 709/223
6,324,646 B1   11/2001 Chen et al.

(Continued)

FOREIGN PATENT DOCUMENTS

| DE | 103 11 697 A1 |   | 10/2004 |
| EP | 1814255 A1    | * | 8/2007  |
| GB | 2397194 A     | * | 7/2004  |

OTHER PUBLICATIONS

"3rd Generation Partnership Project; Technical Specification Group Services and System Aspects; Telecommunication management; Entry Point (EP) Integration Reference Point (IRP); Information Service (IS)"; Release 6; 3GPP TS 32.362 V6.2.0; Jun. 2004; pp. 1-14.

(Continued)

*Primary Examiner*—Dohm Chankong
(74) *Attorney, Agent, or Firm*—Staas & Halsey LLP

(57) ABSTRACT

In a management system of a communication system having at least one manager and an agent, the agent stores information on management functions that can be executed between the manager and the agent. The manager requests information from the agent on the management functions that can be carried out between the manager and the agent, by a request message. The request message contains identification information in an encoded manner for both the manager or the communication system and at least one of the management functions. The agent decodes the identification information of the manager or the communication system and sends the information requested by the request message to the manager, where the information sent relates exclusively to the management function(s) indicated by the identification information in the request message.

15 Claims, 2 Drawing Sheets

U.S. PATENT DOCUMENTS

| | | | | |
|---|---|---|---|---|
| 6,950,935 | B1 * | 9/2005 | Allavarpu et al. | 713/168 |
| 7,065,053 | B2 * | 6/2006 | Godin et al. | 370/252 |
| 2004/0019808 | A1 | 1/2004 | Devine et al. | |
| 2004/0123159 | A1 | 6/2004 | Kerstens et al. | |
| 2006/0015617 | A1 * | 1/2006 | Castro et al. | 709/226 |

OTHER PUBLICATIONS

"3rd Generation Partnership Project; Technical Specification Group Core Network; Numbering, addressing and identification"; Release 6; 3GPP TS 23.003; V6.5.0; Dec. 2004; pp. 10, 11 & 29.

"3rd Generation Partnership Project; Technical Specification Group Services and System Aspects; 3G Telecom Management principles and high level requirements"; 3G TS 32.101; V1.0.0; Apr. 1999; pp. 1-34.

Information technology—Open systems Interconnection—Common management information protocol: Specification; Series X: Data Networks and Open System Communication; ITU-T Recommendation X.711; Oct. 1997; pp. i-iii, 1-35.

International Search Report for European Application No. PCT/EP2005/056800; mailed Aug. 10, 2006.

* cited by examiner

FIG 2

MANAGER                                                              AGENT request: getIRPReference →
(IRPID, IRP Version)

CHECK
NO / YES

← response: getIRPReference
(status = Operation Failed)

← response: getIRPReference
(IRPReference, status = Operation succeeded)

← USE IRP →

RELEASE OF INTEGRATION REFERENCE POINTS

CROSS REFERENCE TO RELATED APPLICATIONS

This application is based on and hereby claims priority to German Application No. 10 2005 010 609.9 filed on Mar. 8, 2005, the contents of which are hereby incorporated by reference.

BACKGROUND

Described below are methods for operating a management system of a communication system having at least one manager and one agent and a manager and an agent for executing the methods.

According to the principles of a management network, also denoted as TMN principles (TMN: Telecommunications Management Network), a plurality of management levels exist for the management of a communication system—such as for example a mobile radio communication system—each level having a dual function, namely a manager function and an agent function, with the exception of the uppermost and lowermost level. In the managing system each level, apart from the lowermost, executes a manager function for the level located thereunder. In the managed system, apart from the uppermost level, an agent function is associated with each level for the next highest level.

Managers initiate operations for network monitoring and network control, by transmitting so-called "requests", which are performed by agents and obtain corresponding feedback, so-called "responses" from the agents. Elements of the telecommunications network, also denoted as resources of the telecommunications network, which in a TMN hierarchy execute the role of an agent, identify relevant so-called "events", such as for example alarms, generate corresponding so-called "notifications", and transmit them in the form of so-called "event reports", to managers in order to permit an efficient network management.

The network management may, among others, include fault management and/or configuration management and/or security management and/or accounting management and/or performance management. By network management, appropriate mechanisms are intended to be provided for information distribution and information management, so that if required a comprehensive picture of the network status is available and the individual objects of the telecommunications network may be efficiently monitored and configured.

The manager-agent communication takes place via so-called management interfaces and/or manager agent interfaces, which are characterized in an object-oriented environment by a communication protocol, such as for example CMIP (Common Management Information Protocol), according to ITU-T X.711 or CORBA (Common Object Request Broker Architecture), and by an object model. Object models serve for modeling resources of the telecommunications network, the resources being subdivided during the modeling into object classes.

Such interfaces are provided, for example, between, on the one hand, the network element management level and, on the other hand, the network element level. The operation and maintenance centers (OMC: Operation and Maintenance Center) on the side of the network element management level, as well as on the side of the network element level devices, such as for example base stations of the base station system (BSS: Base Station System) of a GSM mobile radio network, or base stations of other communication networks, for example NodeBs of a UMTS mobile radio network (UMTS: Universal Mobile Telecommunication System) or radio access points of a WLAN system (WLAN: Wireless Local Area Network), for example according to one of the IEEE 802.11 standards, represent an example of network devices of the manager agent interface.

Management interfaces and/or manager agent interfaces also exist between, on the one hand, the network management level and, on the other hand, the network element management level. The network management centers (NMC: Network Management Center) on the side of the network management level and the operation and maintenance centers (OMC: Operation and Maintenance Center) on the side of the network element management level, for example in the aforementioned GSM or a different mobile radio network or telecommunication network, represent an example of network devices for the manager agent interface.

SUMMARY

An aspect is to demonstrate efficient methods for operating a management network. Moreover, a suitable manager and such an agent are to be proposed for executing the methods.

In the method for operating a management system of a communication system having at least one manager and one agent, the agent stores information about a plurality of management functions which may be executed between the manager and the agent. The manager requests, via a request message, information from the agent about management functions which may be executed between the manager and the agent. The request message contains identification information both of the manager or the communication system and one or more management functions of the plurality of management functions, in an encoded manner. The agent decodes the identification information of the manager or the communication system and in a response message transmits to the manager the information requested by the request message, the information referring exclusively to the management function or management functions indicated in the request message by the identification information.

A plurality of management functions exist which may be executed between a manager and an agent. A management function may, for example, be a management method such as the handling of alarms or tests. A management function may, in particular, correspond to an IRP (Integration Reference Point). The agent stores information about a plurality of management functions, the information preferably allowing the agent to execute the components of the respective management function on the agent side.

The manager requests information from the agent about management functions; in this connection the request is, in particular, an inquiry as to which management functions the agent is able to execute in principle or as regards the manager. The request message of the manager contains one or more encoded values, at least identification information of the manager or the communication system and identification information of one or more management functions being included in the value or values. Prior to the transmission of a response message, the agent decodes the encoded identification information of the manager or the communication system. Preferably, a decoding of the identification information of the management function or management functions is also executed by the agent.

The response message of the agent contains the information requested by the manager, but exclusively relating to those management functions which are displayed in the request message by the encoded identification information. This means that the required information is supplied by the agent relative to every management function which is indicated in the request message by the identification information. With regard to further management functions, such information is transmitted from the agent to the manager neither by the response message nor by a further message transmitted as a response to the request message of the manager. In addition to the requested information concerning the management functions of the request message, further contents may be a constituent part of the response message of the agent.

In a development, in connection with the receipt of the response message by the manager, the management function or management functions which are affected by the response message are executed between the manager and the agent. In this case, the exchange of request messages and response messages between the manager and the agent serves for providing the execution of the respective management function. It is advantageous, in particular, if the execution of the management functions of the request message is not possible without the agent transmitting the response message with the requested information to the manager.

It is advantageous, in particular, if the code for decoding the identification information of the manager or the communication system and one or more management functions is known to the agent and unknown to the manager. In this manner it may be prevented that the manager alters or manipulates the encoded information before the transmission of the request message.

In an embodiment, before the transmission of the request message, the manager receives the encoded identification information from a device which has previously executed an encoding method unknown to the manager relative to the identification information. In this case, the manager has no influence on the encoding of the identification information, thus the manager may carry out no alteration to the encoded identification information prior to the transmission of the request message.

In a development, before the transmission of the response message, the agent checks the decoded identification information of the manager or the communication system for correspondence with the identification information of the manager or the communication system known to the agent. In this manner, it may be ensured by the agent that the encoded information originates from a specific manager and/or from a manager of a specific communication system. This corresponds to checking the authorization of the manager for transmitting the request message. It is also advantageous if the agent, where correspondence is not present, transmits an error message to the manager instead of the response message, and where correspondence is present transmits the response message to the manager. An error message is present insofar as the message transmitted instead of the response message does not contain the information requested by the manager.

In a development, in connection with the receipt of the response message by the manager, a further request message is transmitted from the manager to the agent with a request for information required for the manager to execute management functions between the manager and the agent, relating to the management functions or a partial number of management functions, which are affected by the response message. The manager may select one or more management functions from those management functions, relative to which it has received information requested thereby in the response message and, via the further request message, requests additional information relative to the selected management functions. The further information is, relative to a specific management function, information without which the manager is not able to execute the respective management function.

It is further advantageous if, after receipt of the further request message, the agent checks whether the management functions indicated in the further request message correspond with management functions which are affected by the previously transmitted response message, and where correspondence is not present, transmits an error message to the manager, and where correspondence is present transmits a further response message to the manager with the information requested by the further request message. A verification takes place, therefore, as to whether the request for further information by the manager relates to such management functions, relative to which the agent has already transmitted information in the previously transmitted response message. If this does not apply, an error message is transmitted, insofar as it is an error message when the message does not contain the information required by the manager.

According to a second method, the agent stores information about a plurality of management functions which may be executed between the manager and the agent. The agent receives a request message from the manager with a request for information about management functions which may be executed between the manager and the agent, the request message containing identification information both of the manager or the communication system and one or more management functions of the plurality of management functions, in an encoded manner. The agent decodes the identification information of the manager or the communication system and transmits to the manager in a response message the information requested by the request message, the information exclusively relating to the management function or management functions indicated in the request message by the identification information.

The second method contains the operations on the agent side of the method disclosed above. Further operations on the agent side according to the above explanations, embodiments and developments of the method according disclosed above may form part of the second method.

According to a third method, the manager requests from the agent, via a request message, information about management functions which may be executed between the manager and the agent, the request message containing identification information both of the manager or the communication system and one or more management functions, in an encoded manner. The manager receives a response message from the agent with the information requested by the request message, the information exclusively relating to the management function or management functions indicated in the request message by the identification information.

The third method contains the operations of the method disclosed above on the manager side. Further operations on the management side according to the above explanations, embodiments and developments of the method disclosed above may form part of the third method.

The agent has a storage unit that provides means for storing information about a plurality of management functions which may be executed between the manager and the agent, as well as a receiver and processor that provide means for receiving and processing a request message from the manager with a request for information about management functions which may be executed between the manager and the agent, the request message containing identification information both of the manager or the communication system and one or more management functions of the plurality of management functions in an encoded manner. Moreover, the agent includes at least one processor providing means for decoding the identification information of the manager or the communication system and means for creating and transmitting a response message to the manager with the information requested by the request message, the information exclusively relating to the management function or management functions indicated in the request message by the identification information.

The manager includes a processor and transmitter providing means for creating and transmitting a request message to the agent with a request for information about management functions which may be executed between the manager and the agent, the request message including identification information both of the manager or the communication system and one or more management functions, in an encoded manner. Moreover, the manager includes a receiver providing means for receiving and the processor also provides means for processing a response message from the agent with the information requested by the request message, the information exclusively relating to the management function or management functions indicated in the request message by the identification information.

The agent is suitable, in particular, for executing the steps of the method on the agent side, the method being able to apply to the embodiments and developments. The manager is suitable, in particular, for executing the operations of the method on the manager side, the method also being able to apply to the embodiments and developments. To this end, both the manager and the agent may include further means. Both the manager and the agent may be implemented by a plurality of devices with the respective means connected to one another.

BRIEF DESCRIPTION OF THE DRAWINGS

These and other aspects and advantages will become more apparent and more readily appreciated from the following description of an exemplary embodiment, taken in conjunction with the accompanying drawings of which:

FIG. 2 is a second flow chart for the method.

DETAILED DESCRIPTION OF THE PREFERRED EMBODIMENT

Figure 1:
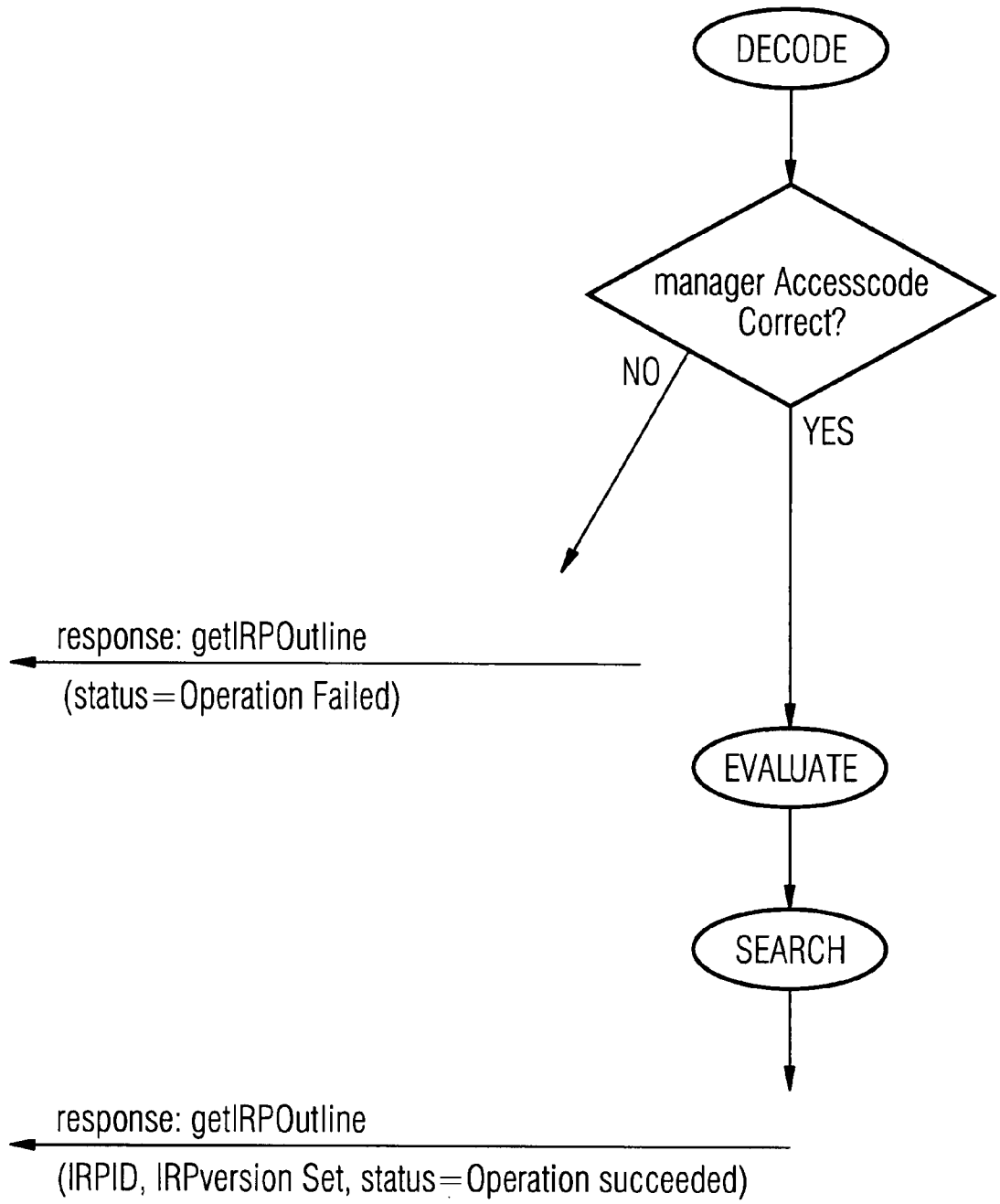
FIG. 1 is a first flow chart for the method.

Reference will now be made in detail to the preferred embodiments, examples of which are illustrated in the accompanying drawings, wherein like reference numerals refer to like elements throughout.

Described in more detail hereinafter is an example with reference to a management system of a mobile radio communication system according to the UMTS standard. An NMC (Network Management Center) and an OMC (Operation and Maintenance Center) are considered, the NMC functioning relative to the OMC as a manager and/or the OMC relative to the NMC as an agent. The interface between the NMC and the OMC is denoted according to the UMTS as an Itf-N interface. Further components of the management system are not considered for reasons of simplicity.

An IRP (Integration Reference Point) represents a management functionality of the Itf-N interface, as disclosed for example in the standard specification 3GPP TS 32.101 (principles and high level requirements). Accordingly, the respective management functionality is defined by a series of standard specifications. The IRPs may define both specific services, such as for example alarm IRP, notification IRP, basic configuration management IRP, and also the behavior of network resources, which support the services, such as for example generic IRP NRM (NRM: Network Resource Model), Core IRP NRM, UTRAN IRP NRM. By using IRPs, the cooperation of different NMCs and OMCs, in particular NMCs and OMCs from different manufacturers, are permitted in a mobile radio communication system.

The TS 32.362 Standard (3GPP TS 32.362, 3rd Partnership Project; Technical Specification Group Services and System Aspects; Telecommunication Management; Entry Point (EP) Integration Reference Point (IRP); Information Service (IS)) defines a mechanism which enables an NMC to locate the IRPs provided by an OMC. To this end, the NMC transmits a request message, denoted as getIRPOutline, to the OMC. The OMC responds as a result with the details of all IRPs implemented thereby and the respective versions of the IRPs. By the response of the OMC to the request message it is thus known to the NMC, in which IRPs the OMC has stored the information required for executing the respective IRPs. With a further request message denoted as getIRPReference, the NMC may request further information on those IPRs which are able to execute the OMC. This further information enables the NMC to execute the respective IRP with the OMC. Thus the NMC according to the related art is able to execute all IRPs implemented on the OMC without restrictions.

The disclosed procedure corresponding to the related art is not advantageous in that it should be possible that an operator of a mobile radio communication system experiences a restriction relative to executing the IRPs implemented on the OMC. All IRPs which the manufacturer of an OMC adds to the software of the OMC, may be used according to the related art by the operator of the mobile radio communication system, even when the operator does not require several IRPs or has not purchased the IRPs. Thus for different operators of mobile radio communication systems, which use different IRPs and thus wish to pay for different IRPs, one respective individual software package is created and implemented for the OMCs of the different systems. When adding a new IRP, in this case of the software solution specific to the operator, the software for the new IRP would have to be stored in the OMC, whereby the normal function of the OMC is at times disrupted.

This costly method is circumvented, as the OMCs include the software for executing all standardized IRPs independently of the operator of the mobile radio communication system i.e. independently of the NMC used, with which they communicate. This means that the OMCs, as a result of their software, are able to execute every IRP. As an NMC, however, according to the agreement with the manufacturer of the OMC, is only allowed to use specific IRPs, with reference to the method disclosed hereinafter, a restriction is introduced with regard to the IRPs which may be used by an NMC relative to an OMC.

FIG. 1 shows a flow chart for the method. On the left-hand side, the manager MANAGER, i.e. the NMC, is arranged, and on the right-hand side the agent AGENT, i.e. the OMC. The messages transmitted between the manager MANAGER and the agent AGENT are symbolized by horizontal arrows, the identification of the message being located above the arrow, whilst information contained in the respective message being provided under the arrow in parenthesis. In addition to the components of the messages provided in parenthesis, the messages may include further components, in particular components of the respective standardized messages, which are not essential for understanding the method.

Initially, the manager MANAGER transmits the request message request: getIRPOutline to the agent AGENT. The request message obtains a value CODE which has been detected by encoding from an IRP list of the IRPs, which the manager MANAGER is authorized to use, and the identification information managerAccessCode of the mobile radio communication system. If the operator, for example, purchases an OMC in combination with the authorization for executing three specific IRPs, identification information of the three IRPs is included in the value CODE of the request message request: getIRPOutline. The identification information managerAccessCode includes the mobile radio communication specific identification pair MCC (Mobile Country Code) and MNC (Mobile Network Code). The value MCC identifies clearly the country of the mobile radio network, in which the manager MANAGER and the agent AGENT are located, disclosed for example in the TS 23.003 Standard (3GPP TS 23.003, 3rd Partnership Project; Technical Specification Group Core Network; Numbering, addressing and identification). The value MNC identifies clearly the mobile radio network, of which the manager MANAGER and the agent AGENT are component parts, disclosed for example in the TS 23.003 Standard.

The operator of the mobile radio communication system obtains the value CODE from the manufacturer of the OMC. In this connection, the same or a different encoding method may be used for different operators. Instead of the encoded value CODE, a plurality of values may also be used, thus for example a value which encodes the IRPs released for the operator and a second value which contains the identification information managerAccessCode in an encoded manner.

The code for decoding the value CODE is known to the agent AGENT. In the DECODE operation, the agent AGENT decodes the value CODE and obtains as a result the details of all IRPs, which the manager MANAGER and/or the operator of the mobile radio communication system is authorized to use as well as the values MCC and MNC. As the values MCC and MNC of the manager MANAGER are known to the agent AGENT, it may detect in managerAccessCode CORRECT?, whether the encoded information managerAccessCode of the request message request: getIRPOutline is the correct values MCC and MNC. In this manner, it may be prevented that a first operator forwards to a second operator an encoded value CODE transmitted thereto by the OMC manufacturer, so that the second operator may use those IRPs of which the use is permitted to the first operator.

If the agent AGENT establishes that the information managerAccessCode of the request message request: getIRPOutline does not correspond to the identification values of the manager MANAGER known thereto, corresponding to the label NO in FIG. 1, it transmits the response message response: getIRPOutline to the manager MANAGER. This contains the information status=OperationFailed, which indicates that the operation started by the request message request: getIRPOutline from the manager MANAGER has failed. Where correspondence is not present of the actual values MCC and MNC of the manager MANAGER with the information managerAccessCode of the request message request: getIRPOutline, the agent AGENT therefore does not transmit to the manager MANAGER information about which IRPs it supports.

If the agent AGENT establishes that the information managerAccessCode of the request message request: getIRPOutline corresponds with the identification values of the manager MANAGER known thereto, according to the label YES of FIG. 1, it evaluates in the EVALUATE operation the IRP list of the IRPs of the request message request: getIRPOutline so that it is known thereto which IRPs the manager MANAGER is allowed to use. In the SEARCH operation the agent AGENT detects the respective identification IRPID of the released IRPs, as well as the respectively associated version or versions IRPVersionSet. The agent AGENT responds to the manager MANAGER with the response message response: getIRPOutline. For each IRP of the IRP list of the request message request: getIRPOutline, the response message response: getIRPOutline contains the identification IRPID and the version and/or versions IRPVersionSet, which the agent AGENT supports. With regard to an IRP, a plurality of versions may be provided. Moreover, the response message response: getIRPOutline includes the statement status=OperationSucceeded, which indicates that the operation started by the manager MANAGER with the request message request: getIRPOutline has been successfully executed.

FIG. 2 shows the sequence of the method after the manager MANAGER has received the response message response: getIRPOutline from the agent AGENT. The manager MANAGER decides which IRPs of the IRPs specified in the response message response: getIRPOutline it would like to use and/or which respective version it would like to use, if a plurality of versions are supported by the agent AGENT. Relative to these IRPs the manager MANAGER transmits the request message request: getIRPReference. For each IRP which the manager MANAGER would like to use, the request message request: getIRPReference contains the identification information IRPID and the accompanying version IRPVersion selected by the manager MANAGER.

After receiving the request message request: getIRPReference in the CHECK operation, the agent AGENT checks whether the values IRPID and IRPVersion of the request message request: getIRPReference refer to released IRPs, i.e. to IRPs which the agent AGENT has named in the response message response: getIRPOutline. As a result, it is avoided that the manager MANAGER still attempts, via the request message request: getIRPReference and by interrogating IRPs which are not contained in the list of the released IRPs, to allow the use of the IRPs which are not authorized thereto.

If the agent AGENT according to the label NO in FIG. 2, establishes that the request message request: getIRPReference contains details of IRPs, which do not belong to the list of the released IRP, thus it transmits the response message response: getIRPReference with the information status: OperationFailed, which indicates that the operation started by the manager MANAGER with the request message request: getIRPReference has failed. If the agent AGENT, however, establishes according to the label YES in FIG. 2, that the request message request: getIRPReference exclusively contains released IRPs, it transmits the response message response: getIRPReference with the information status: OperationSucceeded, which indicates that the operation started by the manager MANAGER with the request message request: getIRPReference has been executed successfully. The response message response: getIRPReference contains for each IRP of the request message request: getIRPReference from the manager MANAGER, reference information IRPReference required for executing the IRP. After receipt of the response message response: getIRPReference, by the manager MANAGER according to the USE IRP operation, the IRPs relative to which the agent AGENT has transmitted to the manager MANAGER the information IRPReference, may be used between the manager MANAGER and the agent AGENT.

As an extension of the disclosed method it is possible that the agent AGENT does not support the use of the encoded value CODE. In this case, the agent AGENT, according to the related art, in the response message response: getIRPOutline may name all IRPs supported thereby in combination with the respective versions.

It is further possible that the value CODE is only used as an optional parameter of the request message request: getIRPOutline. The manager MANAGER may decide in this case to transmit the request message request: getIRPOutline without the value CODE. In this case it is advantageous that an "IRP basic packet" exists, as well as an "IRP selection packet" which contains additional IRPs beyond the IRPs of the IRP basic packet, which involve costs for the operator. If the agentAGENT receives a request message request: getIRPOutline without the value CODE, the response message response: getIRPOutline merely contains details of the IRPs of the IRP basic packet. IRPs of the IRP selection packet are only named when the manager MANAGER uses the value CODE and thus indicates that it has paid for the IRPs of the IRP selection packet.

One advantage of the disclosed method is that new IRPs are able to be integrated in the course of the operation of the management system, without interrupting or disrupting the network monitoring. For explanatory reasons, the case is considered that an operator of a mobile radio communication system monitors this by using the NMC1 and previously released IRPs. After purchasing new IRPs the operator obtains a new encoded value, which has been determined from the information managerAccessCode and the list of the new IRPs. The NMC2 is used temporarily in order to execute the method disclosed with reference to FIGS. 1 and 2, relative to the new IRPs. Parallel to normal monitoring executed by the NMC1, the NMC2 is able to test the new management functions. If this test takes place successfully, the NMC1 may execute the new IRPs with the OMC within the scope of normal monitoring.

The disclosed method is independent of the communication protocol used for the communication between the manager MANAGER and the agent AGENT.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a management system of a communication system having at least a manager and an agent, comprising:
   storing, by the agent, information about management functions that may be executed between the manager and the agent;
   receiving, by the manager, encoded identification information from a device which has previously executed an encoding method unknown to the manager on first identification information for at least one of the management functions and on second identification information for one of the manager and the communication system, the encoded identification information being an encoded form of the first identification information and the second identification information;
   requesting, by the manager via a request message, management function information from the agent about the at least one of the management functions which may be executed between the manager and the agent, the request message including the encoded identification information;
   decoding, by the agent, the encoded identification information of the one of the manager and the communication system; and
   transmitting, from the agent to the manager, a response message containing the management function information, requested by the request message, exclusively relating to the at least one of the management functions indicated in the request message by the encoded identification information.

2. The method as claimed in claim 1, further comprising: receiving the response message by the manager; and executing the at least one of the management functions, affected by the response message, between the manager and the agent.

3. The method as claimed in 2, wherein a code for decoding the encoded identification information is known to the agent and unknown to the manager.

4. The method as claimed in claim 3, further comprising checking, by said agent before said transmitting of the response message and after said decoding produces decoded identification information, the decoded identification information of one of the manager and the communication system for correspondence with known identification information of the manager or the communication system known to the agent.

5. The method as claimed in claim 4, further comprising transmitting, by the agent when correspondence is not found by said checking, an error message to the manager instead of the response message, and
   wherein said transmitting of the response message to the manager occurs only when correspondence is found by said checking.

6. The method as claimed in claim 5, further comprising transmitting, by the manager to the agent in response to receipt of the response message, a further request message requesting required information required for the manager to execute one or more of the at least one of the management functions between the manager and the agent which are affected by the response message.

7. The method as claimed in claim 6, further comprising:
   checking by the agent, after receipt of the further request message, whether the required information indicated in the further request message correspond with the one or more of the at least one of the management functions which are affected by the response message;
   transmitting, by the agent when correspondence is found by said checking, a further response message to the manager with the required information requested by the further request message; and
   transmitting, by the agent when correspondence is not found by said checking, another error message to the manager instead of the further response message.

8. The method as claimed in claim 7, wherein the management functions are integration reference points.

9. A method for operating an agent in a management system of a communication system having at least a manager and the agent, comprising:
   storing information about management functions that may be executed between the manager and the agent;
   receiving a request message from the manager for management function information about at least one of the management functions which may be executed between the manager and the agent, the request message including encoded identification information received by the manager from a device which has previously executed an encoding method unknown to the manager on first identification information for the at least one of the management functions and on second identification information for one of the manager and the communication system, the encoded identification information being an encoded form of the first identification information and the second identification information;

decoding the encoded identification information of the one of the manager and the communication system; and transmitting to the manager a response message containing the management function information, requested by the request message, exclusively relating to the at least one of the management functions indicated in the request message by the encoded identification information.

10. A method for operating a manager in a management system of a communication system having at least the manager and an agent, comprising:

receiving encoded identification information from a device which has previously executed an encoding method unknown to the manager on first identification information for one of the manager and the communication system and on second identification information for at least one of a plurality of management functions that may be executed between the manager and the agent about which the agent has stored information, the encoded identification information being an encoded form of the first identification information and the second identification information;

requesting, via a request message, management function information from the agent about at least one of the management functions which may be executed between the manager and the agent, the request message including the encoded identification information; and receiving from the agent a response message containing the management function information, requested by the request message, exclusively relating to the at least one of the management functions indicated in the request message by the encoded identification information.

11. An agent for a management system of a communication system having a manager and the agent, comprising:

means for storing information about management functions which may be executed between the manager and the agent;

means for receiving and processing a request message from the manager with a request for management function information about at least one of the management functions which may be executed between the manager and the agent, the request message including encoded identification information received by the manager from a device which has previously executed an encoding method unknown to the manager on first identification information for the at least one of the management functions and on second identification information for one of the manager and the communication system, the encoded identification information being an encoded form of the first identification information and the second identification information;

means for decoding the encoded identification information of the manager or the communication system; and means for creating and transmitting a response message to the manager containing the management function information, requested by the request message, exclusively relating to the at least one of the management functions indicated in the request message by the encoded identification information.

12. A manager for a management system of a communication system having at least the manager and an agent, comprising:

means for receiving encoded identification information from a device which has previously executed an encoding method unknown to the manager on first identification information for one of the manager and the communication system on second identification information and for at least one of a plurality of management functions that may be executed between the manager and the agent about which the agent has stored information, the encoded identification information being an encoded form of the first identification information and the second identification information;

means for creating and transmitting a request message to the agent with a request for information about the at least one of the management functions which may be executed between the manager and the agent, the request message including the encoded identification information; and means for receiving and processing a response message from the agent containing the management function information, requested by the request message, exclusively relating to the at least one of the management functions indicated in the request message by the encoded identification information.

13. The method as claimed in any one of claims 1, 9, and 10, wherein the encoding method unknown to the manager includes a first encoding method applied to the first identification information and a second encoding method applied to the second identification information.

14. The agent as claimed in claim 11, wherein the encoding method unknown to the manager includes a first encoding method applied to the first identification information and a second encoding method applied to the second identification information.

15. The manager as claimed in claim 12, wherein the encoding method unknown to the manager includes a first encoding method applied to the first identification information and a second encoding method applied to the second identification information.

* * * * *